(12) United States Patent
Chung et al.

(10) Patent No.: US 9,997,773 B2
(45) Date of Patent: Jun. 12, 2018

(54) NEGATIVE ACTIVE MATERIAL FOR RECHARGEABLE LITHIUM BATTERY, METHOD FOR PREPARING SAME, AND RECHARGEABLE LITHIUM BATTERY COMPRISING SAME

(71) Applicant: LG Chem, Ltd., Seoul (KR)

(72) Inventors: Ju Ho Chung, Daejeon (KR); Eun Kyung Kim, Daejeon (KR); Sang Wook Woo, Daejeon (KR); Sung Bin Park, Daejeon (KR); Ye Ri Kim, Daejeon (KR); Jun Hyuk Song, Daejeon (KR)

(73) Assignee: LG Chem, Ltd. (KR)

( * ) Notice: Subject to any disclaimer, the term of this patent is extended or adjusted under 35 U.S.C. 154(b) by 218 days.

(21) Appl. No.: 14/898,977

(22) PCT Filed: Jul. 23, 2015

(86) PCT No.: PCT/KR2015/007676
§ 371 (c)(1),
(2) Date: Dec. 16, 2015

(87) PCT Pub. No.: WO2016/052850
PCT Pub. Date: Apr. 7, 2016

(65) Prior Publication Data
US 2016/0372741 A1    Dec. 22, 2016

(30) Foreign Application Priority Data
Sep. 30, 2014    (KR) .................. 10-2014-0131020

(51) Int. Cl.
*H01M 4/36*    (2006.01)
*H01M 4/485*    (2010.01)
(Continued)

(52) U.S. Cl.
CPC .......... *H01M 4/366* (2013.01); *H01M 4/131* (2013.01); *H01M 4/136* (2013.01);
(Continued)

(58) Field of Classification Search
None
See application file for complete search history.

(56) References Cited

U.S. PATENT DOCUMENTS

| | | | |
|---|---|---|---|
| 2004/0018430 A1* | 1/2004 | Holman | .................. H01M 4/13 |
| | | | 429/233 |
| 2009/0117470 A1* | 5/2009 | Manev | ................. C01G 23/005 |
| | | | 429/231.95 |

(Continued)

FOREIGN PATENT DOCUMENTS

| CN | 101764209 A | 6/2010 |
|---|---|---|
| CN | 103779550 A | 5/2014 |

(Continued)

OTHER PUBLICATIONS

"Atomic Layer Deposition," Portland State The Lab of Nanoelectronics, pp. 1-11, 2012.*

(Continued)

*Primary Examiner* — Rena Dye Cronin
(74) *Attorney, Agent, or Firm* — Lerner, David, Littenberg, Krumholz & Mentlik, LLP

(57) ABSTRACT

Disclosed are a negative electrode active material for lithium secondary batteries, a method of preparing the same and a lithium secondary battery including the same. More particularly, the negative electrode active material includes a core that includes a lithium titanium oxide represented by Formula 1 below and a coating layer that is located in a surface of the core and includes fluorine, and thus, a moisture content in the active material is decreased and adsorption of outside moisture is inhibited, thereby removing concern for (Continued)

side reaction occurrence due to moisture. In addition, loss of an SEI layer may be prevented due to a stable fluorine-containing coating layer formed on a surface of the active material. As a result, battery performance may be enhanced and stable expression thereof is possible:

$$Li_xTi_yO_4,$$ [Formula 1]

wherein x and y are the same as defined in the present specification.

10 Claims, 3 Drawing Sheets

(51) Int. Cl.
*H01M 4/131* (2010.01)
*H01M 4/62* (2006.01)
*H01M 4/1391* (2010.01)
*H01M 10/0525* (2010.01)
*H01M 4/136* (2010.01)
*H01M 4/1397* (2010.01)
*H01M 4/58* (2010.01)

(52) U.S. Cl.
CPC ....... *H01M 4/1391* (2013.01); *H01M 4/1397* (2013.01); *H01M 4/485* (2013.01); *H01M 4/582* (2013.01); *H01M 4/623* (2013.01); *H01M 10/0525* (2013.01); *Y02T 10/7011* (2013.01)

(56) References Cited

U.S. PATENT DOCUMENTS

| | | | | |
|---|---|---|---|---|
| 2009/0194747 A1* | 8/2009 | Zou | ............ | H01M 4/131 |
| | | | | 252/519.33 |
| 2009/0200510 A1* | 8/2009 | Watanabe | ............ | H01M 4/131 |
| | | | | 252/182.1 |
| 2010/0178556 A1* | 7/2010 | Manev | ............ | H01B 1/122 |
| | | | | 429/199 |
| 2011/0165465 A1* | 7/2011 | Kim | ............ | H01M 4/362 |
| | | | | 429/231.5 |
| 2014/0050981 A1* | 2/2014 | Kang | ............ | H01M 4/366 |
| | | | | 429/211 |
| 2014/0110641 A1 | 4/2014 | Murotani et al. | | |
| 2014/0113197 A1 | 4/2014 | Xiao et al. | | |
| 2014/0234536 A1 | 8/2014 | Xu et al. | | |
| 2014/0335357 A1 | 11/2014 | Takeuchi et al. | | |
| 2015/0340685 A1* | 11/2015 | Theuerkauf | ............ | H01M 4/0411 |
| | | | | 427/58 |
| 2016/0276672 A1* | 9/2016 | Song | ............ | H01M 4/485 |
| 2016/0322638 A1* | 11/2016 | Erickson | ............ | H01M 4/0471 |

FOREIGN PATENT DOCUMENTS

| | | |
|---|---|---|
| JP | 5546787 B2 | 7/2014 |
| KR | 10-2008-0018737 | 2/2008 |
| KR | 10-0853327 B1 | 8/2008 |
| KR | 10-2013-0060987 A | 6/2013 |
| KR | 10-2013-0134239 A | 12/2013 |
| KR | 10-2014-0009927 A | 1/2014 |
| KR | 10-2014-0060122 A | 5/2014 |
| WO | 2008100002 A1 | 8/2008 |
| WO | 2011054440 A1 | 5/2011 |
| WO | 2011054441 A1 | 5/2011 |
| WO | 2012176901 A1 | 12/2012 |
| WO | 2013080515 A1 | 6/2013 |
| WO | 2013081245 A1 | 6/2013 |

OTHER PUBLICATIONS

Extended Search Report from European Application No. 15847413.0, dated Aug. 26, 2016.
International Search Report from PCT/KR2015/007676, dated Sep. 21, 2015.

\* cited by examiner

[Fig. 1]
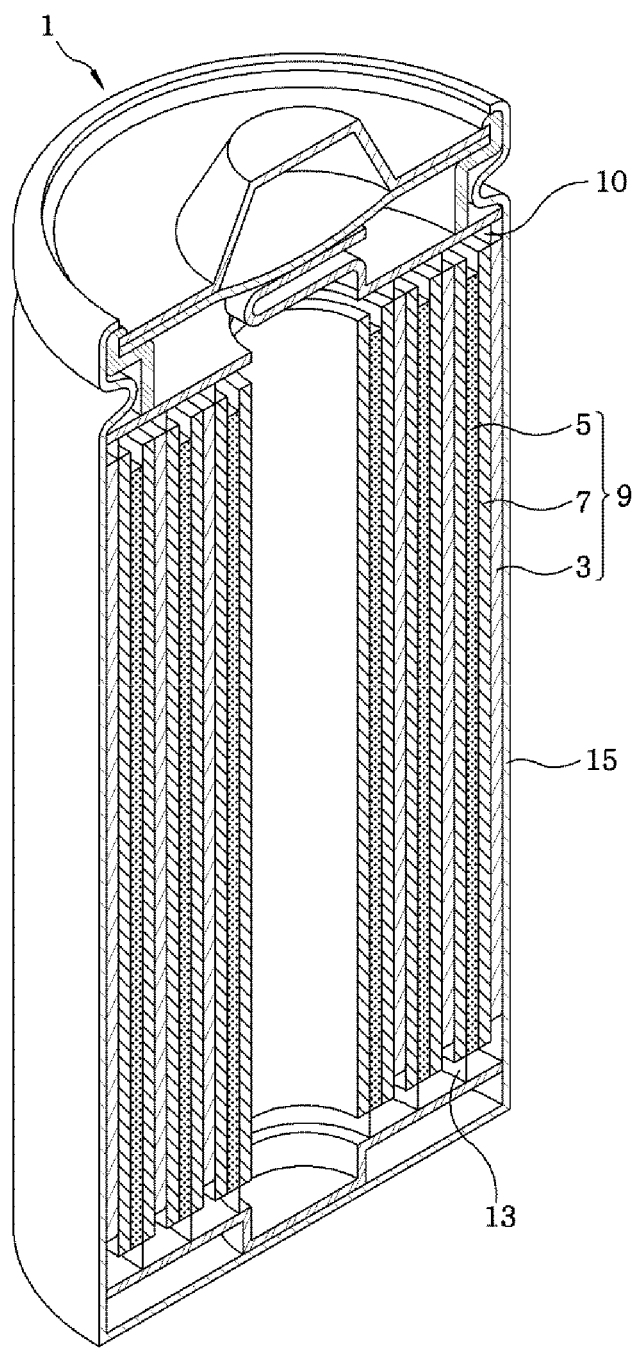

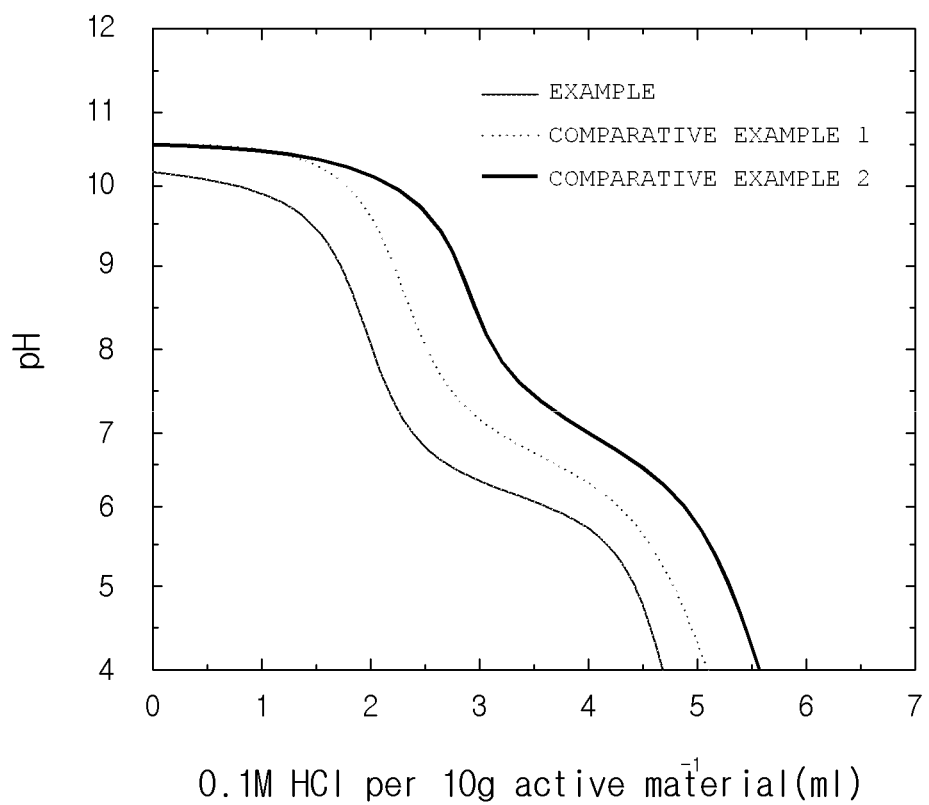
[Fig. 2]

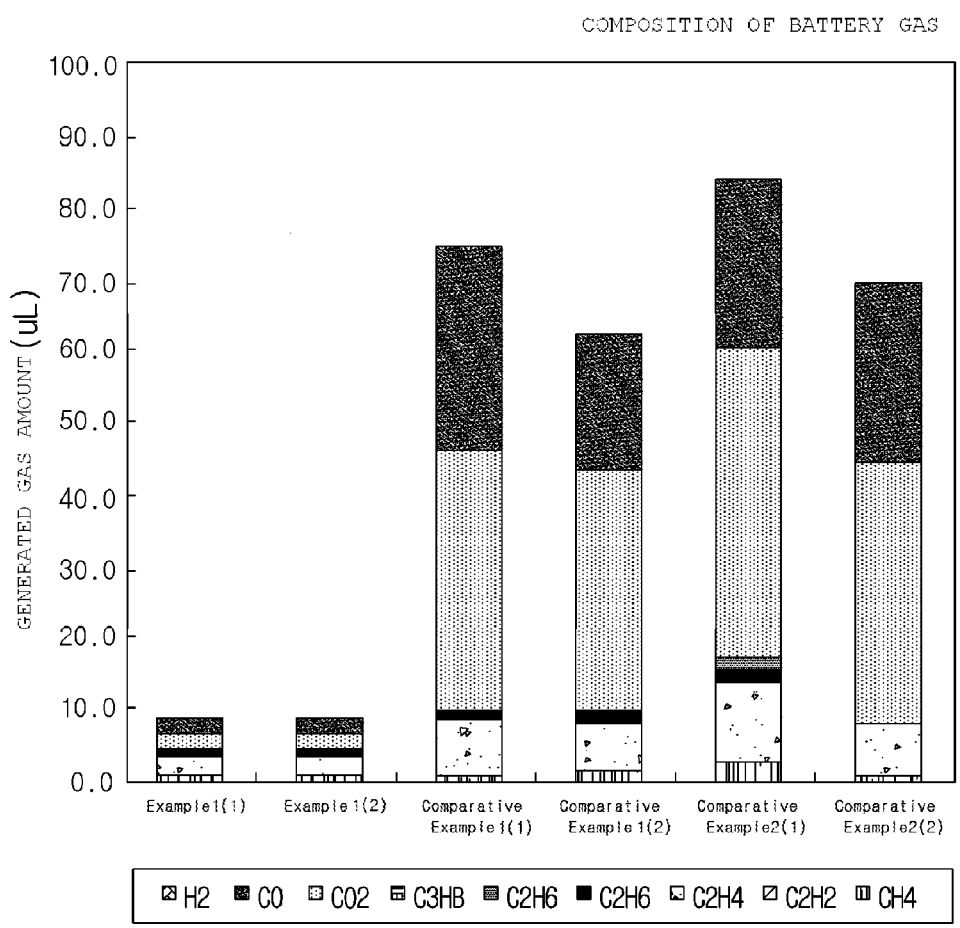
[Fig. 3]

NEGATIVE ACTIVE MATERIAL FOR RECHARGEABLE LITHIUM BATTERY, METHOD FOR PREPARING SAME, AND RECHARGEABLE LITHIUM BATTERY COMPRISING SAME

CROSS-REFERENCE TO RELATED APPLICATION

This application is a national phase entry under 35 U.S.C. § 371 of International Application No. PCT/KR2015/007676, filed Jul. 23, 2015, which claims priority to Korean Patent Application No. 10-2014-0131020, filed Sep. 30, 2014, the disclosures of which are incorporated herein by reference.

TECHNICAL FIELD

The present invention relates to a negative electrode active material for lithium secondary batteries for enhancing and stably expressing battery performance, a method of preparing the same, and a lithium secondary battery including the same.

BACKGROUND ART

Secondary batteries such as lithium secondary batteries (for example, lithium ion batteries) and nickel metal hydride batteries are increasingly, importantly considered as power sources installed in vehicles or power sources of portable terminals such as laptops. In particular, lithium secondary batteries which are light and may provide high energy density may be preferably used as a high-output power source for vehicles, and thus, demand therefor is expected to continuously increase.

In regard to lithium secondary batteries, materials in which intercalation and deintercalation of lithium ions may be performed are used as a positive electrode and a negative electrode active material, a liquid electrolyte is injected after disposing a porous separator between a positive electrode and a negative electrode, and electricity is generated or consumed by oxidation-reduction reaction according to intercalation and deintercalation of lithium ions in the negative electrode and the positive electrode.

In particular, in lithium secondary batteries, various carbon-based material types including artificial graphite, natural graphite, hard carbon, etc., in which intercalation and deintercalation of lithium is possible, have been used as negative electrode active materials. Since graphite among carbon-based materials has a low discharge voltage of −0.2 V with respect to lithium, a battery using graphite as a negative electrode active material exhibits a high discharge voltage of 3.6 V and there are also advantages in energy density of lithium secondary batteries. In addition, long-term lifespan of lithium secondary batteries is guaranteed due to excellent reversibility. However, graphite active materials have a low capacity with respect to energy density per unit volume of an electrode plate due to low graphite density (theoretical density: 2.2 g/cc) upon manufacture into an electrode plate, and problems such as swelling in a battery and consequent capacity reduction, due to side reaction with an organic electrolyte, which easily occurs in high discharge voltage.

In order to address the problems of the carbon-based negative electrode active materials, Si-based negative electrode active materials and negative electrode active materials using oxides such as tin oxides, lithium vanadium-based oxides, lithium titanium-based oxides, having a high capacity, compared to graphite, are being developed and researched.

However, high-capacity Si-based negative electrode materials suffer extreme volume change during charge/discharge and thus particles are split, whereby lifespan characteristics are poor.

In addition, in the cases of oxide negative electrodes, satisfactory battery performance is not exhibited and thus research thereinto are underway. In particular, lithium titanium oxides (hereinafter referred to as "LTO") among the oxide-based negative electrode active materials exhibit high electricity capacity maintenance ratio and stable lifespan characteristics, e.g., change in a crystal structure does not occur also in an over-charge state. However, there is a problem of battery degradation due to high moisture content in an active material itself.

RELATED ART DOCUMENT

Patent Document

Korean Patent Application Pub. No. 1020080018737 (published on 28 Feb. 2008)

DISCLOSURE

Technical Problem

Therefore, the present invention has been made in view of the above problems, and it is an object of the present invention to provide a negative electrode active material for lithium secondary batteries which may enhance battery performance and stably express the battery performance by preventing loss of a solid electrolyte interface (SEI) layer through formation of a stable lithium fluoride (LiF) film, without concern for side reaction occurrence, due to decrease of a moisture amount in an active material and, at the same time, prevention of adsorption of outside moisture, and a method of preparing the same.

It is another object of the present invention to provide a lithium secondary battery that may stably express battery performance enhanced through inclusion of the negative electrode active material.

Technical Solution

In accordance with an aspect of the present invention, the above and other objects can be accomplished by the provision of a negative electrode active material for lithium secondary batteries, the negative electrode active material comprising a core including lithium titanium oxide represented by Formula 1 below and a coating layer located in a surface of the core and including fluorine:

$$Li_xTi_yO_4, \qquad \text{[Formula 1]}$$

(wherein $0.8 \le x \le 1.4$ and $1.6 \le y \le 2.2$).

The lithium titanium oxide represented by Formula 1 may be $Li_4Ti_5O_{12}$ having a spinel structure.

The coating layer may include lithium fluoride (LiF).

The coating layer may include chemisorbed fluorine (F) in a core surface.

The coating layer may be included in an amount of 0.1 to 3 parts by weight based on 100 parts by weight of the core.

The negative electrode active material may be prepared by reacting the core comprising the lithium titanium oxide represented by Formula 1 with a fluorine-containing polymer at 300□ or more.

In accordance with another aspect of the present invention, there is provided a method of preparing a negative electrode active material for lithium secondary batteries, the method comprising reacting a core including a lithium titanium oxide represented by Formula 1 and a fluorine-containing polymer at 300□ or more.

The fluorine-containing polymer may be any one selected from the group consisting of poly(vinylidene fluoride), poly(vinylidene fluoride-co-hexafluoropropene), polytetrafluoroethylene and a mixture thereof.

The fluorine-containing polymer is used in an amount of 0.007 to 0.22 mole based on 1 mole of the lithium titanium oxide.

In accordance with yet another aspect of the present invention, there is provided a lithium secondary battery comprising a positive electrode comprising a positive electrode active material and a negative electrode including a negative electrode active material, which are disposed opposite each other, and an electrolyte disposed between the positive electrode and the negative electrode, wherein the negative electrode active material comprises a core that comprises a lithium titanium oxide represented by Formula 1 below, and a coating layer that is located in a surface of the core and includes fluorine.

Particulars of embodiments of the present invention are described in the detailed description below.

Advantageous Effects

A negative electrode active material for lithium secondary batteries according to the present invention may enhance battery performance and stably express the battery performance by preventing loss of a solid electrolyte interface (SEI) layer through formation of a stable fluoride (LiF)-containing coating film on an electrode surface, without concern for side reaction occurrence, due to decrease of a moisture amount in an active material and, at the same time, prevention of adsorption of outside moisture, and a method of preparing the same.

DESCRIPTION OF DRAWINGS

The above and other objects, features and other advantages of the present invention will be more clearly understood from the following detailed description taken in conjunction with the accompanying drawings, in which:

FIG. 1 illustrates an exploded oblique view of a lithium secondary battery according to an embodiment of the present invention;

FIG. 2 illustrates graphs representing results for negative electrode active materials prepared according to Example, Comparative Example 1 and Comparative Example 2 of the present invention measured using a potential difference titration device; and FIG. 3 illustrates graphs representing gas chromatography measurement results for negative electrode active materials prepared according to Example, Comparative Example 1 and Comparative Example 2 of the present invention.

BEST MODE

Now, the present invention will be described in more detail with reference to the following examples for easy implementation by those skilled in the art. These examples are provided only for illustration of the present invention and should not be construed as limiting the scope and spirit of the present invention.

Terms used in the present invention are used only to explain particular embodiments and the present invention is limited thereto. Singular expressions include plural expression so long as not definitely disclosed otherwise. It should be understood that, in the present invention, terms such as "includes" and "has" are used to designate presence of characteristics, numbers, steps, operations, constituents, components or combinations thereof disclosed in the specification and do not exclude presence or presence possibility of one or more characteristics, numbers, steps, operations, constituents, components or combinations.

The present invention is characterized in side reaction due to moisture in a battery is inhibited by reducing a moisture amount in LTO and, at the same time, preventing adsorption of outside moisture through reaction of a lithium titanium oxide (hereinafter referred to as "LTO") and a fluorine (F)-containing polymer material at high temperature upon preparation of LTO-based negative electrode active material for lithium secondary batteries, and loss of a solid electrolyte interface (SEI) is prevented by forming stable fluorine-containing coating layer on an LTO surface, whereby battery performance enhancement and stable performance expression are possible.

That is, a negative electrode active material for lithium secondary batteries according to an embodiment of the present invention includes a core including a lithium titanium oxide represented by Formula 1 below and a coating layer located in a surface of the core and including fluorine:

$$Li_xTi_yO_4,$$  [Formula 1]

(wherein $0.8 \leq x \leq 1.4$ and $1.6 \leq y \leq 2.2$).

The negative electrode active material may be prepared by reacting a core including the lithium titanium oxide represented by Formula 1 with a fluorine-containing polymer at 300° C. or more.

More particularly, the negative electrode active material may be prepared according to a preparation method wherein the core including the lithium titanium oxide represented by Formula 1 and the fluorine-containing polymer are mixed and then reacted at 300° C. or more or 300 to 500□ under an inactive gas atmosphere such as a nitrogen atmosphere or an argon atmosphere.

In regard to preparation of the negative electrode active material, the lithium titanium oxide represented by Formula 1 constituting the core may be $Li_4Ti_5O_{12}$, particularly having a spinel structure. Here, although a mole number of the oxygen of Formula 1 is 4, Formula 1 is not limited thereto and the mole number may be represented by multiples thereof within a range within which a mole ratio of the each atom of Formula 1 is satisfied. That is, when a mole number of the oxygen of Formula 1 is 12, Formula 1 may be represented by $Li_{3x}Ti_{3y}O_{12}$. The $Li_4Ti_5O_{12}$ having a spinel structure may prevent an SEI film from being too thickly formed on a negative electrode surface and may enhance electrochemical characteristics and stability of batteries by controlling thermal runaway factors.

In addition, the core including the lithium titanium oxide preferably has an average particle diameter of 3 to 15 μm when a specific surface area of an active material and the density of negative electrode mixture are considered.

In addition, in regard to the preparation of the negative electrode active material, the fluorine-containing polymer may be particularly poly(vinylidene fluoride) (PVdF), poly (vinylidene fluoride-co-hexafluoropropene (PVdF-co-HFP), polytetrafluoroethylene (PTE) or the like, or a mixture of two or more thereof.

When enhancement effects according to the present invention are considered, the content of fluorine in the fluorine-containing polymer may be more particularly 0.1 to 3% by weight.

In addition, in regard to preparation of the negative electrode active material, the core and the fluorine-containing polymer may be used in a proper content considering the content of a coating layer in a finally prepared negative electrode active material.

In particular, in regard to the negative electrode active material, the coating layer including fluorine is preferably included in an amount of 0.1 to 3 parts by weight based on 100 parts by weight of the core. When the content of the coating layer is less than 0.1 parts by weight, complete coating of a core is difficult and thus a lithium titanium oxide constituting the core is exposed to outside, thereby continuously reacting with moisture. In addition, contact force between the core and the coating layer is decreased, and expansion and thus contraction are continuously repeated according to cycle progression, whereby cracks may occur. Meanwhile, when the content of the coating layer is greater than 3 parts by weight, the thickness of the coating layer is increased, whereby electrical conductivity is decreased and initial battery efficiency and performance may be decreased. When enhancement effects according to formation of the coating layer are considered, the coating layer may be particularly included in a content of 0.1 to 1 parts by weight based on 100 parts by weight of the core. Accordingly, when the content of the coating layer is considered, a mixture of the core and the fluorine-containing polymer may include 0.007 to 0.22 mole of fluorine-containing polymer based on 1 mole of the lithium titanium oxide.

In addition, upon preparation of the negative electrode active material, the core and the fluorine-containing polymer are preferably reacted at 300° C. or more, or 300 to 500° C. When the reaction temperature is less than 300° C., reaction between the lithium titanium oxide and the fluorine-containing polymer might not sufficiently carried out, and unreacted fluorine-containing polymers may remain to decrease battery properties. In addition, when the reaction temperature exceeds 500° C., reaction products may be carbonized.

A negative electrode active material prepared through reaction at high temperature as described above is present in the core including the lithium titanium oxide represented by Formula 1 and a surface of the core, and includes a coating layer including fluorine.

Here, the fluorine-containing polymer used in the preparation process of the negative electrode active material is not physically combined or coated as it is on the core surface and is included as a fluorine-containing compound such as lithium fluoride through reaction of fluorine atoms in the polymer and lithium in LTO constituting the core. In addition, in portions in which LiF is not formed due to non-reaction between LTO and F, the fluorine-containing polymer is fired and thus fluorine (F) is chemisorbed to an LTO surface.

As such, the lithium fluoride included in the coating layer has superior stability, compared to the fluorine-containing polymer, whereby loss of an SEI layer occurring during charge/discharge may be prevented, battery performance may be enhanced, and stable expression thereof is possible. In addition, the lithium fluoride in the coating layer blocks influence of hydrogen fluoride (HF) formed due to moisture present in a battery except for a negative electrode on a negative electrode active material and thus more stable battery performance may be expressed.

In addition, fluorine included in a coating layer makes the coating layer hydrophobic and thus effectively inhibits adsorption and influx of outside moisture. In addition, side reaction due to moisture within a battery may be prevented.

Furthermore, since moisture contained in the LTO is used in a formation process of the coating layer, a moisture amount of LTO itself may be decreased. As a result, side reaction due to moisture is decreased upon assembly of a battery, and thus, battery performance may be enhanced. In particular, the content of the moisture in the core of the negative electrode active material may be 500 to 2000 ppm.

In the negative electrode active material prepared according to the preparation method described above, LiF formed through chemical reaction of the LTO and LiF formed through chemical reaction of the LTO and the fluorine-containing polymer, and fluorine atoms chemisorbed by firing the fluorine-containing polymer are included in a surface of a core including the LTO, and thus, battery characteristic enhancement effects are superior and stable performance expression is possible.

According to another embodiment of the present invention, a lithium secondary battery including a negative electrode active material according to the preparation method is provided.

In particular, the lithium secondary battery includes a positive electrode comprising a positive electrode active material and a negative electrode including a negative electrode active material, which are disposed opposite each other, and an electrolyte disposed between the positive electrode and the negative electrode, and the negative electrode active material is the same as that described above.

The lithium secondary battery may be classified into lithium ions batteries, lithium ion polymer battery and lithium polymer battery according to used separator and electrolyte types, a cylindrical shape, a square shape, a coin shape, a pouch shape, etc. according to shape thereof, and a bulk type and a film type according to the size thereof.

FIG. 1 illustrates ㅜ exploded oblique view of a lithium secondary battery 1 according to another embodiment of the present invention. FIG. 1 is provided to explain the present invention, but the present invention is not limited thereto.

Referring to FIG. 1, in regard to the lithium secondary battery 1, a negative electrode 3, a positive electrode 5, and a separator 7 between the negative electrode 3 and the positive electrode 5 are installed, thereby manufacturing an electrode assembly 9. The electrode assembly 9 is located in a case 15 and an electrolyte (not shown) is injected thereinto. Accordingly, the negative electrode 3, the positive electrode 5 and the separator 7 are impregnated with an electrolyte.

Each of conductive lead members 10 and 13 for collecting current occurring when a battery operates may be adhered to each of the negative electrode 3 and the positive electrode 5. Each of the lead members 10 and 13 may induce current generated from the positive electrode 5 and the negative electrode 3 to a positive electrode terminal and a negative electrode terminal.

The negative electrode 3 may be manufactured by preparing a composition for forming a negative electrode active material layer through mixing of a negative electrode active material, a binder and, selectively, a conductive material, and then by spreading the composition on negative electrode current collector such as copper foil.

The negative electrode active material is the same as that described above.

The binder adheres electrode active material particles to one another, and an electrode active material to a current collector. Specific examples of the binder include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber, fluorine rubber and various copolymers thereof.

In addition, preferable embodiments of the solvent include dimethyl sulfoxide (DMSO), alcohol, N-methylpyrrolidone (NMP), acetone, water, etc.

The current collector may be any one metal selected from the group consisting of copper, aluminum, stainless steel, titanium, silver, palladium, nickel, alloys thereof and combinations thereof. The stainless steel may be surface-treated with carbon, nickel, titanium or silver, and the alloy is preferably an aluminum-cadmium alloy. In addition, a non-conductive polymer, a conductive polymer, or the like surface-treated with fired carbon and a conductive material may be used.

The conductive material is used to provide conductivity to an electrode and may be any materials that do not induce chemical change and have electrical conductivity. Examples of the conductive material include metal powders, metal fibers, etc. such as natural graphite, artificial graphite, carbon black, acetylene black, ketjen black, carbon fiber, copper, nickel, aluminum, silver, etc. In addition, a mixture of one or more of conductive materials such as polyphenylene derivatives may be used.

As a method of spreading the composition for forming a negative electrode active material layer on the current collector, any one of publicly known methods may be selected or a new proper method may be used, considering characteristics of materials. Preferably, the composition for forming a negative electrode active material layer is distributed on a current collector and then uniformly dispersed using a doctor blade, etc. In some cases, distribution and dispersion processes may be carried as one process. In addition, a method such as die casting, comma coating, screen printing, etc. may be used.

The positive electrode 5 may be manufactured by mixing a positive electrode active material, a conductive material and a binder to prepare composition for forming a positive electrode active material layer, and then by coating the composition for forming a positive electrode active material layer on a positive electrode current collector such as aluminum foil and then rolling the same, as in the negative electrode 3. A positive electrode plate may be manufactured by casting the positive electrode active material composition on a separate support and then laminating a film obtained through peeling of the support on a metal current collector.

As the positive electrode active material, a compound in which reversible intercalation and deintercalation of lithium are possible (lithiated intercalation compound) may be used. In particular, a lithium-containing transition metal oxide is preferably used, and, for example, any one selected from group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$ and $a+b+c=1$), $LiNi_{1-y}Co_yO_2$, $LiCo_{1-y}Mn_yO_2$, $LiNi_{1-y}Mn_yO_2$ ($0\leq y<1$), $Li(Ni_aCo_bMn_c)O_4$ ($0<a<2$, $0<b<2$, $0<c<2$, and $a+b+c=2$), $LiMn_{2-z}Ni_zO_4$, $LiMn_{2-z}Co_zO_4$ ($0<z<2$), $LiCoPO_4$ and $LiFePO_4$ or a mixture of two or more thereof may be used. In addition, other than the oxides, sulfide, selenide, halide, etc. may be used.

The conductive material and the binder are the same as those described in the negative electrode.

The electrolyte may include an organic solvent and a lithium salt.

As the organic solvent, any one functioning as a medium in which ions involved in electrochemical reaction of a battery may migrate may be used without special limitation. In particular, examples of the organic solvent include ester solvents, ether solvents, ketone solvents, aromatic hydrocarbon solvents, alkoxyalkane solvents, carbonate solvents, and the like, and mixtures of two or more thereof.

Specific examples of the ester solvent include methyl acetate, ethyl acetate, n-propyl acetate, dimethyl acetate, methyl propionate, ethyl propionate, γ-butyrolactone, decanolide, γ-valerolactone, mevalonolactone, γ-caprolactone, δ-valerolactone, ε-caprolactone, etc.

Specific examples of the ether-based solvent include dibutyl ether, tetraglyme, 2-methyltetrahydrofuran, tetrahydrofuran, etc.

Specific examples of the ketone-based solvent include cyclohexanone, etc. Specific examples of the aromatic hydrocarbon-based organic solvent include benzene, fluorobenzene, chlorobenzene, iodobenzene, toluene, fluorotoluene, xylene, etc. Examples of the alkoxyalkane solvent include dimethoxy ethane, diethoxy ethane, etc.

Specific examples of the carbonate solvent include dimethyl carbonate (DMC), diethylcarbonate (DEC), dipropylcarbonate (DPC), methylpropylcarbonate (MPC), ethylpropylcarbonate (EPC), methylethylcarbonate (MEC), ethyl methyl carbonate (EMC), ethylene carbonate (EC), propylene carbonate (PC), butylene carbonate (BC), fluoroethylene carbonate (FEC), etc.

The lithium salt is not specifically limited so long as lithium ions used in a lithium secondary battery 1 may be provided. Particularly the lithium salt may be any one selected from group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiN(C_aF_{2a+1}SO_2)(C_bF_{2b+1}SO_2)$ (where a and b are a natural number, preferably $1\leq a\leq 20$ and $1\leq b\leq 20$), LiCl, LiI, $LiB(C_2O_4)_2$ and a mixture thereof.

When the lithium salt is dissolved in an electrolyte, the lithium salt functions as a supply source of lithium ions in the lithium secondary battery 1 and may facilitate lithium ion migration between the positive electrode 5 and the negative electrode 3. Accordingly, the lithium salt is preferably included in a concentration of approximately 0.6 M to 2 M in the electrolyte. When the concentration of the lithium salt is less than 0.6 M, conductivity of an electrolyte is decreased and thus electrolyte performance is deteriorated. When the concentration of the lithium salt is greater than 2 M, the viscosity of an electrolyte is increased and thus mobility of lithium ions is decreased. When such electrolyte conductivity and lithium ion mobility are considered, the concentration of the lithium salt may be particularly controlled to approximately 0.7 to 1.6 M in the electrolyte.

The electrolyte may further include, other than the electrolyte constituents, additives (hereinafter referred to as "other additives") that are generally used in a battery in order to enhance lifespan characteristics, inhibit battery capacity decrease, and increase a battery discharge capacity.

Specific examples of the other additives include vinylene carbonate (VC), metal fluoride (for example, LiF, RbF, TiF, AgF, AgF☐, $BaF_2$, $CaF_2$, $CdF_2$, $FeF_2$, $HgF_2$, $Hg_2F_2$, $MnF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF4_4$, $NbF_5$, $SbF_5$, $TaF_5$, $BiF_5$, $MoF_6$, $ReF_6$, $SF_6$, $WF_6$, $CoF_2$, $CoF_3$, $CrF_2$, $CsF$, $ErF_3$, $PF_3$, $PbF_3$, $PbF_4$, $ThF_4$, $TaF_5$, $SeF_6$, etc.), glutaronitrile (GN), succinonitrile (SN), adiponitrile (AN), 3,3'-thiodipropionitrile (TPN), vinylethylene carbonate (VEC), fluoroethylene carbonate (FEC), difluoroethylene carbonate, fluorodimethyl carbonate, fluoroethyl methyl carbonate, lithium bis(oxalato)borate (LiBOB), lithium difluoro(oxalato) borate (LiDFOB), lithium (malonato oxalato) borate (LiMOB), etc., and a mixture of two or more thereof. The other additives may be present in an amount of 0.1 to 5% by weight based on the total weight of the electrolyte.

As the separator 7, any one used as a separator in general lithium secondary batteries may be used without special limitation and, particularly, a separator having low resistance against ion migration of an electrolyte and superior electrolyte absorption ability is preferable. In particular, only a porous polymer film, for example, a porous polymer film manufactured from a polyolefin-based polymer such as ethylene homopolymers, propylene homopolymers, ethylene/butene copolymers, ethylene/hexene copolymers and ethylene/methacrylate copolymers, etc., or laminates thereof may be used. Alternatively, general porous non-woven fabric, for example, non-woven fabric composed of glass fiber having a high melting point or polyethylene terephthalate fiber, may be used, but the present invention is not limited thereto.

In the present embodiment, the lithium secondary battery 1 having a cylinder shape is described, but technology of the present invention is not limited to the cylinder-shape lithium secondary battery 1, and any shapes are possible so long as operation as a battery is possible.

As described above, the lithium secondary battery including the negative electrode active material according to the present invention exhibits superior discharge capacity and stable cycle-lifespan characteristics and rate characteristics, and thus, may be usefully used in portable devices, requiring fast charging speed, such as mobile phones, laptops, digital cameras and camcorders, electric vehicles such as hybrid electric vehicles (HEVs) and plug-in HEVs (PHEVs), and medium/large energy storage systems.

MODE FOR INVENTION

Now, the present invention will be described in more detail with reference to the accompanying drawings. These examples are provided for illustrative purposes only and should not be construed as limiting the scope and spirit of the present invention.

PREPARATION EXAMPLE

Preparation of Negative Electrode Active Material $Li_4Ti_5O_{12}$ powder and PVdF were mixed in a weight ratio of 1:0.02, and fired at 400☐ under a nitrogen atmosphere for hours, thereby preparing a negative electrode active material.

EXAMPLE

Manufacture of Lithium Secondary Battery

The negative electrode active material prepared according to the preparation example, carbon black as a conductive material and PVdF as a binder were mixed in a weight ratio of 90:5:5 in N-methylpyrrolidone as a solvent, thereby preparing a composition for forming a negative electrode active material layer. The composition was spread on a copper current collector, thereby forming a negative electrode active material layer.

$LiNi_{0.5}Mn_{1.5}O_4$ as an LNMO-based positive electrode active material, carbon black as a conductive material and PVdF as a binder were mixed in a weight ratio of 90:5:5 in N-methylpyrrolidone as a solvent, thereby preparing a composition for forming a positive electrode active material layer. The composition was spread on an aluminum current collector, thereby forming a positive electrode active material layer.

A porous polyethylene separator was disposed between the positive electrode and the negative electrode to manufacture an electrode assembly, and the electrode assembly was placed inside a case. Subsequently, electrolyte was injected into the case, thereby manufacturing a lithium secondary battery. Here, the electrolyte was prepared by dissolving 1.15 M lithium hexafluorophosphate ($LiPF_6$) in an organic solvent composed of a mixture of ethylene carbonate (EC), dimethyl carbonate (EMC) and ethyl methyl carbonate (DEC) mixed in a volume ratio of 3:4:3.

The prepared negative electrode active material was observed using a scanning electron microscope. A result was illustrated in FIG. 2a of Korean Patent Application No. 2014-0131020 (filed on 30 Sep. 2014) as the original application of the present invention.

COMPARATIVE EXAMPLE 1

Manufacture of Lithium Secondary Battery $Li_4Ti_5O_{12}$ powder and PVdF were mixed in a weight ratio of 1:0.02 and fired at 250☐ under a nitrogen atmosphere for hours, thereby preparing a negative electrode active material. A lithium secondary battery was manufactured in the same manner as in Example, except that the powder was used.

The prepared negative electrode active material was observed using a scanning electron microscope. A result was illustrated in FIG. 2b of Korean Patent Application No. 2014-0131020 (filed on 30 Sep. 2014) as the original application of the present invention.

COMPARATIVE EXAMPLE 2

Manufacture of Lithium Secondary Battery

A lithium secondary battery was manufactured in the same manner as in Example, except that a $Li_4Ti_5O_{12}$ powder, which was not surface-treated, as a negative electrode active material.

The prepared negative electrode active material was observed using a scanning electron microscope. A result was illustrated in FIG. 2c of Korean Patent Application No. 2014-0131020 (filed on 30 Sep. 2014) as the original application of the present invention.

EXPERIMENTAL EXAMPLE 1

Evaluation of Characteristics of Negative Electrode Active Material

In order to confirm whether the LiF coating layer was satisfactorily formed, fluorine (F) contents were analyzed using WD-XRF (Rigaku ZSX Primus II, Analyte type: Oxide). Results are summarized in Table 1 below.

TABLE 1

| wt % | Example | Comparative Example 1 | Comparative Example 2 |
|---|---|---|---|
| $Al_2O_3$ | 0.022 | 0.012 | 0.007 |
| $SiO_2$ | 0.035 | 0.052 | 0.027 |
| $P_2O_5$ | 0.146 | 0.185 | 0.007 |
| $SO_3$ | 0.012 | 0.031 | 0.227 |
| Cl | 0.014 | 0.017 | 0.01 |
| $K_2O$ | 0.053 | 0.224 | — |
| CaO | 0.006 | 0.008 | 0.008 |
| $Fe_2O_3$ | 0.014 | 0.019 | — |
| $As_2O_3$ | 0.003 | 0.003 | — |
| $F_2O$ | 1.805 | 1.685 | 0.062 |
| $Nb_2O_5$ | 0.212 | 0.241 | 0.12 |
| $HfO_2$ | 0.039 | 0.034 | 0.005 |
| $Li_4Ti_5O_{12}$ | 97.64 | 97.49 | 99.527 |

As shown in Table 1, F is detected in Example and Comparative Example 1, but is not detected in Comparative Example 2. In addition, in the case of Example, the amount of detected F is larger than that in Comparative Example 1 because the coating layer of Example includes a larger amount of F chemisorbed in a core surface.

Meanwhile, impurities, $Li_2CO_3$ and LiOH, remain in the LTO upon preparation of the LTO. Accordingly, whether PVdF reacted with lithium present in LiOH and $Li_2CO_3$ and thus a LiF layer was formed was measured, upon preparation of the negative electrode active material of Example, whereby the content of $Li_2CO_3$ and LiOH remaining in the LTO was decreased.

The amount of $Li_2CO_3$ and LiOH remainders in each of the negative electrode active materials prepared according to Example, Comparative Example 1 and Comparative Example 2 was measured using a potential difference titration device (pH titration method, Model: Metrohm 736 GP Titrino). Results are summarized in FIG. 2 and Table 2 below.

TABLE 2

|  | Example | Comparative Example 1 | Comparative Example 2 |
|---|---|---|---|
| $Li_2CO_3$ (wt %) | 0.153 | 0.157 | 0.181 |
| LiOH (wt %) | 0.001 | 0.011 | 0.012 |
| Total (wt %) | 0.154 | 0.168 | 0.193 |

As shown in FIG. 2 and Table 2, the amount of LiOH and $Li_2CO_3$ remainders is 0.154% in the case of Example, but the amount of LiOH and $Li_2CO_3$ remainders is 0.193% in the case of Comparative Example 2 in which a LiF layer is not coated. That is, it can be confirmed that PVdF reacts with lithium present in LiOH and $Li_2CO_3$ and thus a LiF layer is formed, whereby, in Example, the amount of the LiOH and $Li_2CO_3$ remainders is decreased. In addition, it can be confirmed that, in the case of Comparative Example 1 in which temperature is elevated to 250□ instead of 400° C., the amount of the LiOH and $Li_2CO_3$ remainders is decreased but larger than the case of Example in which temperature is elevated to 400° C.

EXPERIMENTAL EXAMPLE 2

Gas Analysis of Lithium Secondary Battery

In order to confirm gas generation due to moisture in the negative electrode active material, loss of an SEI layer, and adsorption or influx of outside moisture, two lithium secondary batteries manufactured according to each of Example, Comparative Example 1 and Comparative Example 2 were stored at 60° C. for one week. Subsequently, gas generation in the batteries was evaluated using gas chromatography (GC. Results are summarized in Table 3 below and FIG. 3. In Table 3 below, gas amounts (ml/mg) are represented by calculating a gas amount per 1 mg of LTO.

TABLE 3

|  | Example | | Comparative Example 1 | | Comparative Example 2 | |
|---|---|---|---|---|---|---|
|  | (1) | (2) | (1) | (2) | (1) | (2) |
| Total gas amount (ml) | 9.2 | 9.1 | 77 | 62 | 83 | 69 |
| Gas amount (ml/mg) | 0.11 | 0.11 | 1.02 | 0.82 | 1.08 | 0.91 |

As shown in FIG. 3 and Table 3, it can be confirmed that, in Example, a gas generation amount is 0.11 ml/mg and very small, when compared to a gas generation amount of 1 ml/mg in Comparative Example 2 in which a LiF layer is not formed. In addition, it can be confirmed that, in Comparative Example 1 in which a coating temperature is 250° C., the amount of LiOH and $Li_2CO_3$ remainders is decreased, but a gas generation amount is 0.92 ml/mg on average, i.e., a gas generation amount is not largely decreased. This occurs since LiF formed at 250° C. does not completely envelop LTO. Accordingly, it can be known that a coating temperature should be 300° C. or more.

As a result, the battery according to Example exhibits remarkably superior gas generation inhibition and prevention characteristics, when compared to the batteries according to Comparative Examples 1 and 2.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Description of Symbols

1: LITHIUM SECONDARY BATTERY
3: NEGATIVE ELECTRODE
5: POSITIVE ELECTRODE
7: SEPARATOR
9: ELECTRODE ASSEMBLY
10, 13: LEAD MEMBER
15: CASE

INDUSTRIAL APPLICABILITY

As described above, a negative electrode active material according to the present invention includes a core that includes a lithium titanium oxide represented by Formula 1 below and a coating layer that is located in a surface of the core and includes fluorine:

$$Li_xTi_yO_4, \quad \text{[Formula 1]}$$

wherein x and y are the same as in those described in the present specification.

The negative electrode active material may be used in lithium secondary batteries. A lithium secondary battery including the negative electrode active material does not have concern for side reaction occurrence due to moisture, through decrease of a moisture content in the active material and inhibition of adsorption of outside moisture, and may prevent loss of an SEI layer through a stable fluorine-containing coating layer formed on a surface of the active material. As a result, battery performance may be enhanced and stable expression thereof is possible.

The invention claimed is:

1. A negative electrode active material for lithium secondary batteries, the negative electrode active material comprising a core including a lithium titanium oxide represented by Formula 1 below and a coating layer located in a surface of the core and including fluorine, wherein the content of moisture in the core is 500 to 2000 ppm:

$Li_{3x}Ti_{3y}O_{12}$, [Formula 1]

(wherein $0.8 \leq x \leq 1.4$ and $1.6 \leq y \leq 2.2$).

2. The negative electrode active material according to claim 1, wherein the lithium titanium oxide represented by Formula 1 is $Li_4Ti_5O_{12}$ having a spinel structure.

3. The negative electrode active material according to claim 1, wherein the coating layer comprises lithium fluoride (LiF).

4. The negative electrode active material according to claim 1, wherein the coating layer comprises chemisorbed fluorine (F) in a core surface.

5. The negative electrode active material according to claim 1, wherein the coating layer is included in an amount of 0.1 to 3 parts by weight based on 100 parts by weight of the core.

6. The negative electrode active material according to claim 1, wherein the negative electrode active material is prepared by reacting the core comprising the lithium titanium oxide represented by Formula 1 with a fluorine-containing polymer at 300° C. or more.

7. A method of preparing the negative electrode active material of claim 1 for lithium secondary batteries, the method comprising reacting the core and a fluorine-containing polymer at 300° C. or more.

8. The method according to claim 7, wherein the fluorine-containing polymer is any one selected from group consisting of poly(vinylidene fluoride), poly(vinylidene fluoride-co-hexafluoropropene), polytetrafluoroethylene) and a mixture thereof.

9. The method according to claim 7, wherein the fluorine-containing polymer is used in a mole ratio of 0.007 to 0.22 based on 1 mole of the lithium titanium oxide.

10. A lithium secondary battery comprising:
a positive electrode comprising a positive electrode active material and the negative electrode including a negative electrode active material of claim 1, which are disposed opposite each other, and
an electrolyte disposed between the positive electrode and the negative electrode.

* * * * *